US010877650B2

(12) United States Patent
Sakashita et al.

(10) Patent No.: US 10,877,650 B2
(45) Date of Patent: Dec. 29, 2020

(54) INFORMATION TERMINAL AND NON-TRANSITORY COMPUTER-READABLE RECORDING MEDIUM WITH DISPLAY CONTROL PROGRAM RECORDED THEREON

(71) Applicant: KYOCERA Document Solutions Inc., Osaka (JP)

(72) Inventors: Fumiya Sakashita, Osaka (JP); Yoichi Hiranuma, Osaka (JP); Shoichi Sakaguchi, Osaka (JP); Shohei Fujiwara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 77 days.

(21) Appl. No.: 16/238,117

(22) Filed: Jan. 2, 2019

(65) Prior Publication Data
US 2019/0220172 A1 Jul. 18, 2019

(30) Foreign Application Priority Data

Jan. 12, 2018 (JP) .................................. 2018-003802

(51) Int. Cl.
*G06F 3/041* (2006.01)
*G06F 3/0488* (2013.01)
(Continued)

(52) U.S. Cl.
CPC ........ *G06F 3/04845* (2013.01); *G06F 3/0486* (2013.01); *G06F 3/04883* (2013.01);
(Continued)

(58) Field of Classification Search
CPC . G06F 3/04883; G06F 3/0488; G06F 3/04845
See application file for complete search history.

(56) References Cited

U.S. PATENT DOCUMENTS 9,851,876 B2 * 12/2017 Chien ................. G06F 3/04842
2011/0107272 A1 * 5/2011 Aguilar ............... G06F 3/04883
715/853
(Continued)

FOREIGN PATENT DOCUMENTS

JP 2017-083944 A 5/2017

*Primary Examiner* — Jordany Nunez
(74) *Attorney, Agent, or Firm* — IP Business Solutions, LLC

(57) ABSTRACT

An information terminal includes: a display section; a display control section; a touch panel; a gesture detecting section that detects, when the display control section allows the display section to display images in three or more split regions of a display screen, a pinch-out gesture of spreading two fingers touching respective adjacent two of the three or more split regions; and a region setting section that makes, upon detection of the pinch-out gesture, a setting that the adjacent two split regions are aligned along directions of the pinch-out gesture and that the display screen is split into two split regions to be exclusively placed therewithin. The display control section allows an enlarged display of the images of the split regions subjected to the pinch-out gesture in the split regions set by the region setting section and avoids a display of the images of the other one or more split regions.

4 Claims, 10 Drawing Sheets

(51) Int. Cl.
  *G06F 3/0482*  (2013.01)
  *G06F 3/0484*  (2013.01)
  *G06F 3/0486*  (2013.01)
  *G06F 9/44*  (2018.01)
  *G06F 3/0481*  (2013.01)

(52) U.S. Cl.
  CPC ............... *G06F 9/44* (2013.01); *G06F 3/041* (2013.01); *G06F 3/0481* (2013.01); *G06F 2203/04803* (2013.01); *G06F 2203/04808* (2013.01)

(56) References Cited

U.S. PATENT DOCUMENTS

| | | | | |
|---|---|---|---|---|
| 2013/0176232 | A1* | 7/2013 | Waeller | G06F 3/04883 345/173 |
| 2015/0253937 | A1* | 9/2015 | Kim | H04N 5/2624 715/765 |
| 2018/0164987 | A1* | 6/2018 | Murphy | G06F 3/04883 |
| 2018/0373427 | A1* | 12/2018 | Wang | G06F 3/04842 |

\* cited by examiner

PINCH-OUT GESTURE ON ADJACENT SPLIT REGIONS (SPLIT REGIONS HAVING DIFFERENT INITIAL POINTS P11, P21)

2-SPLIT DISPLAY IN TWO SPLIT REGIONS D1, D2 SUBJECTED TO PINCH-OUT GESTURE

PINCH-IN GESTURE ON ADJACENT SPLIT REGIONS (SPLIT REGIONS HAVING DIFFERENT INITIAL POINTS P31, P41)

RETURN TO 4-SPLIT DISPLAY

CASE WHERE DURING PINCH-OUT GESTURE DISTANCE OF MOVEMENT OF ONE FINGER IS LARGER THAN THAT OF THE OTHER FINGER

SPLIT REGION WHERE DISTANCE OF MOVEMENT IS LONGER IS DISPLAYED LARGER
(DISPLAY AT SPLIT RATIO ACCORDING TO RATIO BETWEEN DISTANCES OF MOVEMENT)

SWIPE GESTURE OF MOVING FINGER TOUCHING ONE SPLIT REGION TOWARD THE OTHER SPLIT REGION

BOTH SPLIT REGIONS REVERSED IN POSITION

DIRECT RETURN TO 4-SPLIT DISPLAY

INFORMATION TERMINAL AND NON-TRANSITORY COMPUTER-READABLE RECORDING MEDIUM WITH DISPLAY CONTROL PROGRAM RECORDED THEREON

INCORPORATION BY REFERENCE

This application claims priority to Japanese Patent Application No. 2018-003802 filed on Jan. 12, 2018, the entire contents of which are incorporated by reference herein.

BACKGROUND

The present disclosure relates to information terminals, information processing systems, and non-transitory computer-readable recording media with display control programs recorded thereon, and particularly relates to a technique for displaying only images of adjacent two of three or more split regions of a display screen on an enlarged scale with a single gesture.

A mobile terminal (an example of a display device), such as a smartphone, is equipped with a touch panel provided on a display screen of a display section, accepts a user's gesture (such as a touch gesture) on the display screen of the display section through the touch panel, and operates in response to the user's gesture.

In a general display device, a 4-in-1 image containing four images assembled into a 2-by-2 matrix is displayed on a display screen. When a user makes a pinch-out gesture of spreading two fingers placed on respective display regions for two images adjacent in the row direction in the 4-in-1 image while keeping the two fingers in touch with the display regions, the assembly of the two images subjected to the pinch-out gesture is dissolved and the two images are separately displayed side by side in the row direction, but the remaining other two images remain assembled in a 2-in-1 image and likewise displayed side by side in the row direction.

SUMMARY

A technique improved over the aforementioned technique is proposed as one aspect of the present disclosure.

An information terminal according to an aspect of the present disclosure includes a display section, a display control section, a touch panel, a gesture detecting section, and a region setting section. The display control section allows the display section to display respective images in a plurality of split regions into which a display screen is split. The touch panel is provided on the display screen of the display section. The gesture detecting section detects, when the display control section allows the display section to display the images in three or more split regions of the display screen, a pinch-out gesture of spreading two fingers placed on respective adjacent two of the three or more split regions while keeping the two fingers in touch with the adjacent two split regions based on a detection signal from the touch panel. The region setting section makes, upon detection of the pinch-out gesture by the gesture detecting section, a setting that the adjacent two split regions are aligned on the display screen along directions of spreading movement of the two fingers during the pinch-out gesture and that the display screen is split into two split regions to place only both the two split regions within the display screen. The display control section allows an enlarged display of the images of the split regions subjected to the pinch-out gesture in both the split regions set by the region setting section and avoids a display of the images of the one or more split regions other than both the split regions.

An information processing system according to another aspect of the present disclosure is an information processing system in which an information terminal capable of displaying a plurality of images delivered via a network is communicable with an application server. The information terminal includes a request section, a display section, a display control section, a touch panel, a gesture detecting section, a region setting section, a notification section, and an acquisition section. The application server includes a transmission section. The request section requests a delivery source of a plurality of images to deliver the plurality of images. The display control section allows the display section to display respective images in a plurality of split regions into which a display screen is split. The touch panel is provided on the display screen of the display section. The gesture detecting section detects, when the display control section allows the display section to display the images in three or more split regions of the display screen, a pinch-out gesture of spreading two fingers placed on respective adjacent two of the three or more split regions while keeping the two fingers in touch with the adjacent two split regions based on a detection signal from the touch panel. The region setting section makes, upon detection of the pinch-out gesture by the gesture detecting section, a setting that the adjacent two split regions are aligned on the display screen along directions of spreading movement of the two fingers during the pinch-out gesture and that the display screen is split into two split regions to place only both the two split regions within the display screen. The notification section outputs to the application server a notification of the setting that only both the two split regions into which the display screen is split are placed within the display screen, the setting having been made by the region setting section. The acquisition section acquires screen information transmitted by the transmission section of the application server. The transmission section of the application server transmits, according to the notification from the notification section, respective pieces of the screen information on the split regions subjected to the pinch-out gesture on the display screen of the information terminal. The display control section allows an enlarged display of the images of the split regions subjected to the pinch-out gesture in both the split regions set by the region setting section and avoids a display of the images of the one or more split regions other than both the split regions.

In a non-transitory computer-readable recording medium with a display control program recorded thereon according to still another aspect of the present disclosure, the display control program allows a computer including a processor to function, when the processor executes the display control program, as: a display control section that allows a display section to display respective images in a plurality of split regions into which a display screen is split; a gesture detecting section that detects, when the display control section allows the display section to display the images in three or more split regions of the display screen, a pinch-out gesture of spreading two fingers placed on respective adjacent two of the three or more split regions while keeping the two fingers in touch with the adjacent two split regions based on a detection signal from a touch panel; and a region setting section that makes, upon detection of the pinch-out gesture by the gesture detecting section, a setting that the adjacent two split regions are aligned on the display screen along directions of spreading movement of the two fingers during the pinch-out gesture and that the display screen is split into two split regions to place only both the two split region within the display screen, and the display control program further allows the display control section to function to allow an enlarged display of the images of the split regions subjected to the pinch-out gesture in both the split regions set by the region setting section and avoid a display of the images of the one or more split regions other than both the split regions.

DETAILED DESCRIPTION

Hereinafter, a detailed description will be given of an information terminal and an information processing system according to an embodiment of the present invention with reference to the drawings.

Figure 1:
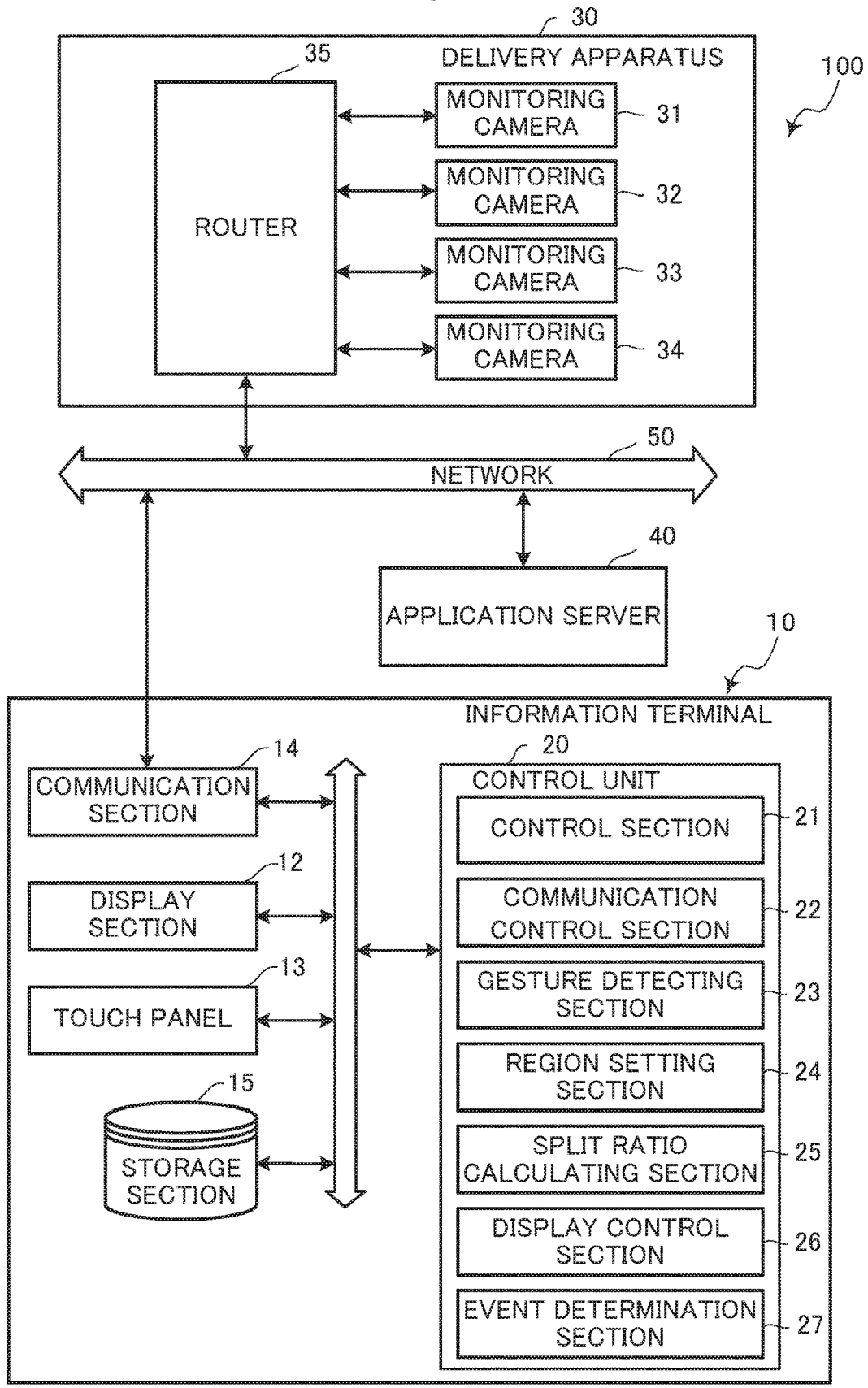
FIG. 1 is a block diagram showing configurations of an information terminal and an information processing system according to one embodiment of the present disclosure.

FIG. 1 is a block diagram showing configurations of an information terminal and an information processing system according to the present disclosure. An information processing system 100 according to this embodiment is an information processing system that enables monitor images taken with a plurality of monitoring cameras 31 to 34 of a delivery apparatus 30 to be viewed with a Web browser of an information terminal 10, such as a tablet computer.

The information processing system 100 includes the information terminal 10, the delivery apparatus 30, an application server 40, and a network 50. The information terminal 10, the delivery apparatus 30, and the application server 40 are mutually communicably connected via the network 50.

The delivery apparatus 30 includes a plurality of (four in this embodiment) monitoring cameras 31 to 34 and a router 35 communicable with each of the information terminal 10 and the application server 40. The router 35 is connected to the monitoring cameras 31 to 34. Note that the monitoring cameras 31 to 34 are devices for taking still images and moving images (these types of images are referred to collectively as images) and the moving images are also referred to as videos. Alternatively, a plurality of images may be supplied from a single monitoring camera.

The application server 40 is a Web application server that manages the IP addresses of the four monitoring cameras 31 to 34 connected to the router 35 and, upon receipt of a request from the information terminal 10 to view the images being taken with the monitoring cameras 31 to 34, provides screen information enabling the images to be displayed in the browser.

The information terminal 10 is, for example, a mobile terminal, such as a tablet computer, and includes a display section 12, a touch panel 13, a communication section 14, a storage section 15, and a control unit 20. These components are capable of transferring data or signals to and from each other via a bus. The information terminal 10 is provided with service from the application server 40 and, for this purpose, a browser is installed on the information terminal 10. The information terminal 10 may be another mobile terminal such as a smartphone, a desktop personal computer, or other types of terminals.

The display section 12 is formed of a liquid crystal display (LCD), an organic EL (OLED: organic light-emitting diode) or others.

The touch panel 13 is, for example, a touch panel of a so-called resistive film system or a capacitance system. The touch panel 13 is disposed on the display screen of the display section 12 and detects a touch of the display screen of the display section 12 with a finger or the like, together with the point of touch. When detecting a touch thereon with a finger or the like, the touch panel 13 outputs a detection signal indicating the coordinate of the point of touch to a gesture detecting section 23 and so on of the control unit 20. Therefore, the touch panel 13 serves as an operating section through which a user's operation by gesture on the display screen of the display section 12 is to be input.

The information terminal 10 may further include, in addition to the above touch panel 13, hard keys as an operating section through which a user's operation is to be input.

The communication section 14 is a communication interface including a communication module, such as an unshown wireless LAN chip. The communication section 14 has the function of communicating with the delivery apparatus 30 and the application server 40.

The storage section 15 is formed of a large-capacity SSD (solid state drive), a large-capacity HDD (hard disk drive) or the like and stores various types of data and programs.

The control unit 20 is formed of a processor, a RAM (random access memory), a ROM (read only memory), and so on. The processor is a CPU (central processing unit), an MPU, an ASIC or the like. When a control program stored in the above ROM or the storage section 15 is executed by the above processor, the above control unit 20 functions as a control section 21, a communication control section 22, a gesture detecting section 23, a region setting section 24, a split ratio calculating section 25, a display control section 26, and an event determination section 27. Alternatively, each of the above components of the control unit 20 may not be implemented by the operation of the control unit 20 in accordance with the above-described control program but may be constituted by a hardware circuit.

The control section 21 governs the overall operation control of the information terminal 10. Furthermore, the control section 21 is connected to the display section 12, the touch panel 13, the communication section 14, the storage section 15, and so on and performs the operation control of each of the above components and signal or data transfer to and from each of the components. The control section 21 controls, for example, the display control section 26 in order to control the display operation of the display section 12. The communication control section 22 has the function of controlling the communication operation of the communication section 14.

Figure 5:
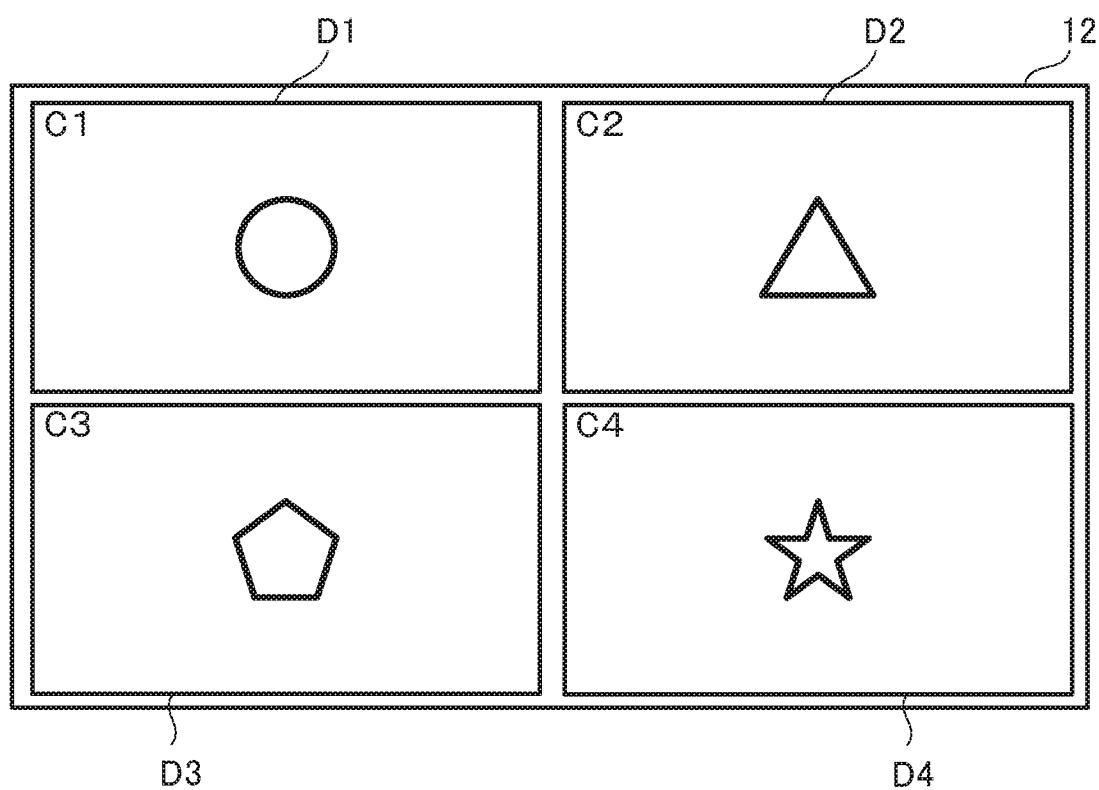
FIG. 5 is a view showing an example where respective images of four monitoring cameras are displayed in respective four split regions of a display screen of the information terminal.

The display control section 26 controls, as shown in FIG. 5 to be described later, the display screen of the display section 12 to provide, for example, a four-screen display. Specifically, the display control section 26 controls the display screen of the display section 12 so that the respective monitor images taken with the four monitoring cameras 31 to 34 are displayed in respective four split regions D1 to D4 formed by splitting the display screen into four equal parts composed of upper left, upper right, lower left, and lower right parts. Furthermore, the display control section 26 allows the display section 12 to display "C1" to "C4" at the upper left corners of the split regions D1 to D4 as shown in FIG. 5 in order to indicate that the images in the split regions are respective images taken with the monitoring cameras 31 to 34. In FIG. 5, the respective monitor images of the monitoring cameras 31 to 34 are represented by a circle, a triangle, a pentagon, and a star. In this embodiment, an object person included in the image in the split region D1 (the circle shown in FIG. 5) is considered as an object person to be monitored and the triangle, pentagon, and star shown in the other split regions D2 to D4 are not considered as object persons to be monitored.

The gesture detecting section 23 identifies a user's gesture input by a user, based on a detection signal output from the touch panel 13. Then, the control section 21 does control according to the identified user's gesture. Examples of the user's gesture include a touch gesture, a pinch-out gesture, a pinch-in gesture, a swipe gesture, and a return gesture.

<Touch Gesture>

When the user touches the touch panel 13 with his/her finger and immediately releases the finger from the touch panel 13, the touch panel 13 outputs to the gesture detecting section 23 a detection signal indicating a point at which the touch has been detected. When receiving the detection signal, the gesture detecting section 23 detects, based on the detection signal, that the user's gesture is a touch gesture. This touch gesture is made, for example, on a soft key on the display screen of the display section 12.

<Pinch-Out Gesture>

When the user touches the touch panel 13 with his/her two fingers and spreads both the fingers apart in the touch state, the touch panel 13 detects two initial points where touches have been first detected and outputs to the gesture detecting section 23 two detection signals indicating respective series of points of movement from the initial points to final points where the touches have been last detected. Based on the two detection signals input to the gesture detecting section 23, the gesture detecting section 23 detects that the user's gesture is a pinch-out gesture and detects directions of operation and the final points of the pinch-out gesture. In this embodiment, the pinch-out gesture is, for example, a gesture for displaying, among the four split regions D1 to D4 within the display screen of the display section 12, only the adjacent two split regions D1, D2 subjected to the pinch-out gesture within the display screen and for displaying images of the two split regions D1, D2 on an enlarged scale. Specifically, when, as shown in FIG. 6, the user touches a point (for example, an initial point P11) in the split region D1 of the display screen of the display section 12 and a point (for example, an initial point P21) in the split region D2 of the display screen with his/her thumb and index finger, respectively, and in this touch state spreads both the fingers apart to the final points P12, P22, the touch panel 13 detects the initial points P11, P21 and outputs to the gesture detecting section 23 two detection signals indicating respective series of points of movement from the initial points P11, P21 to the final points P12, P22. Based on the input two detection signals, the gesture detecting section 23 detects that the user's gesture is a pinch-out gesture and detects directions of operation and the final points P12, P22 of the pinch-out gesture. Although, in this embodiment, the pinch-out gesture is an enlargement gesture in which the aspect ratios of the split regions D1, D2 shown in FIG. 5 are not maintained (the same applies to the case where the split regions D3, D4 are enlarged), it may be an enlargement gesture in which the aspect ratios are maintained.

<Pinch-in Gesture>

When the user touches the touch panel 13 with his/her two fingers and brings both the fingers close to each other in the touch state, the touch panel 13 detects two initial points where touches have been first detected and outputs to the gesture detecting section 23 two detection signals indicating respective series of points of movement from the initial points to final points where the touches have been last detected. Based on the two detection signals input to the gesture detecting section 23, the gesture detecting section 23 detects that the user's gesture is a pinch-in gesture and detects directions of operation and the final points of the pinch-in gesture. In this embodiment, the pinch-in gesture is, for example, a gesture for, when only the adjacent two split regions D1, D2 are displayed on the display screen of the display section 12 as a result of the above-described pinch-out gesture, returning the display on the display screen to the images of the original four split regions D1 to D4. Specifically, when, as shown in FIG. 7, the user touches a point (for example, an initial point P31) in the split region D1 of the display screen of the display section 12 and a point (for example, an initial point P41) in the split region D2 of the display screen with his/her thumb and index finger, respectively, and in this touch state brings both the fingers close to each other to final points P32, P42, the touch panel 13 detects the initial points P31, P41 and outputs to the gesture detecting section 23 two detection signals indicating respective series of points of movement from the initial points P31, P41 to the final points P32, P42. Based on the input two detection signals, the gesture detecting section 23 detects that the user's gesture is a pinch-in gesture and detects directions of operation and the final points P32, P42 of the pinch-in gesture. Although, in this embodiment, the pinch-in gesture is a gesture for returning to the original four split regions D1 to D4 shown in FIG. 5 without maintaining the aspect ratios of the split regions D1, D2 shown in FIG. 7, it may be a gesture for returning to the original four split regions D1 to D4 while maintaining the aspect ratios.

<Swipe Gesture>

Figure 9A:
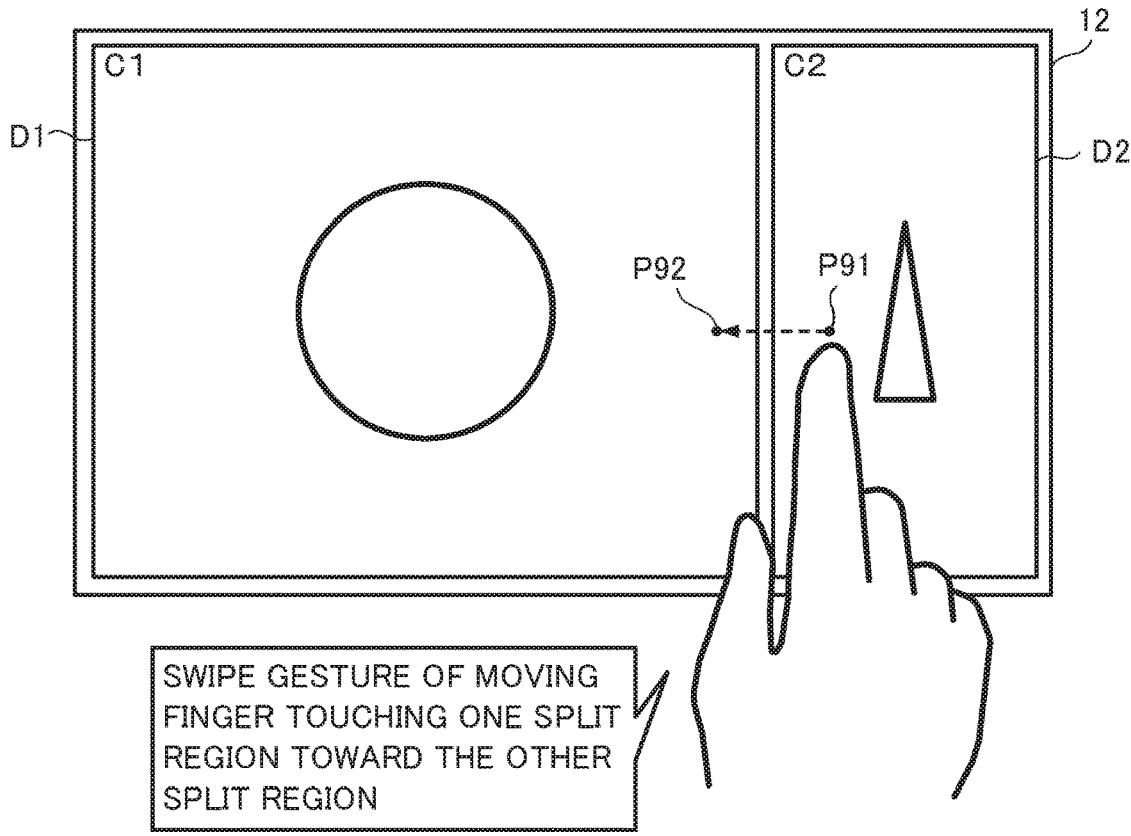
FIG. 9A is a view showing a swipe gesture on one split region shown in FIG. 8B.

When the user touches the touch panel 13 with his/her finger and immediately moves the finger in the touch state, the touch panel 13 outputs to the gesture detecting section 23 a detection signal indicating a series of points of movement from an initial point at which the touch has been first detected to a final point at which the touch has been last detected. When receiving the detection signal, the gesture detecting section 23 detects, based on the detection signal, the user's gesture as a swipe gesture and a direction of operation of the swipe gesture. In this embodiment, this swipe gesture is made, for example, as shown in FIG. 9 to be described later, on one split region D2 (or D1) of the two split regions D1, D2 of the display screen of the display section 12 in reversing the positions of the two split regions D1, D2. Specifically, when, as shown in FIG. 9A, the user touches a point (for example, an initial point P91) in the split region D2 of the display screen of the display section 12 with his/her index finger and in this touch state immediately moves the finger toward the split region D1, the touch panel 13 detects the initial point P91 and outputs to the gesture detecting section 23 a detection signal indicating a series of points of movement from the initial point P91 to a final point P92. Based on the input detection signal, the gesture detecting section 23 detects that the user's gesture is a swipe gesture and detects a direction of operation and the final point P92 of the swipe gesture.

<Return Gesture>

Figure 8A:
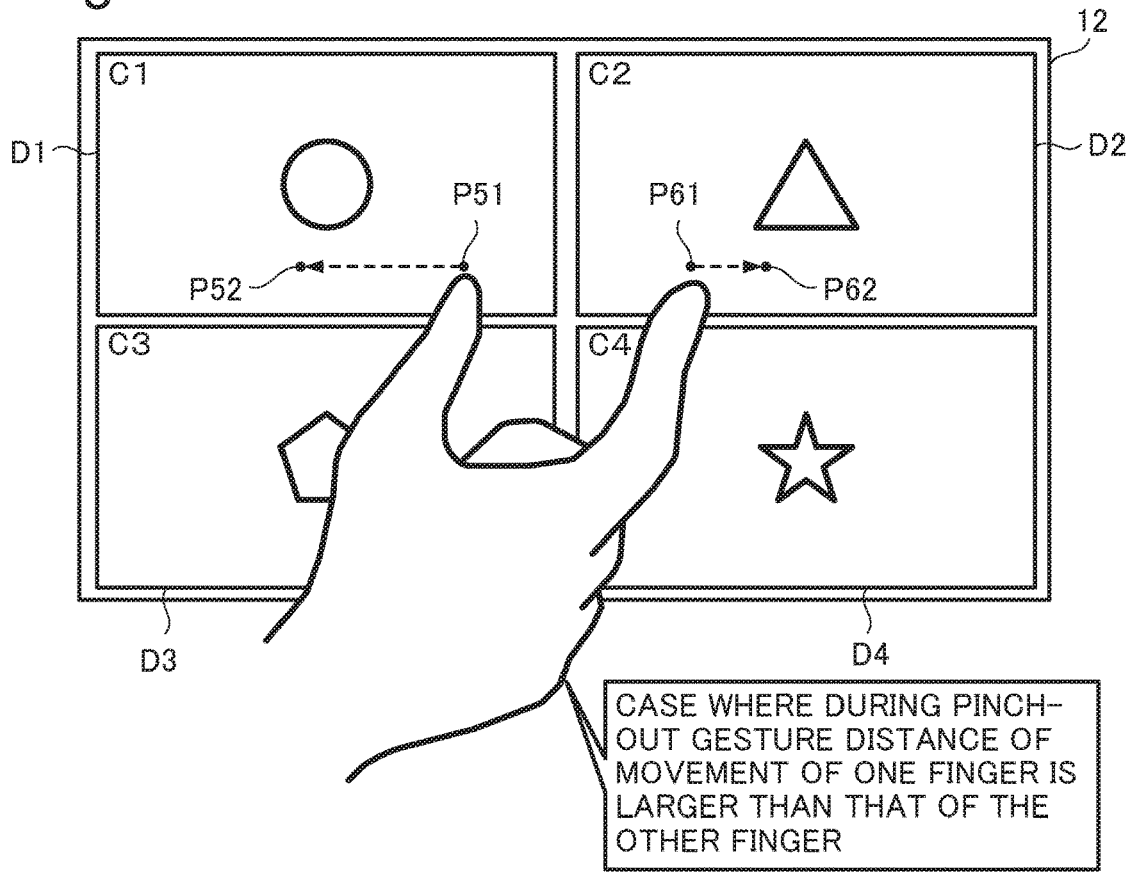
FIG. 8A is a view showing that in the pinch-out gesture the distance of movement of one finger is longer than that of the other finger.
Figure 8B:
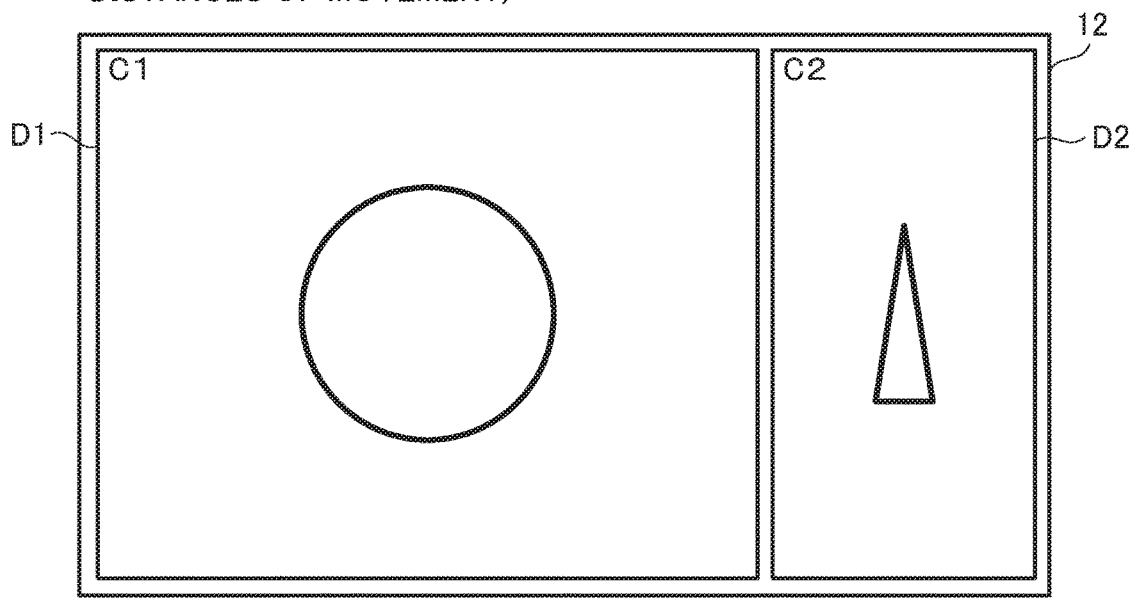
FIG. 8B is a view showing that the split region where the distance of movement is longer is displayed larger.

When the user makes a return gesture in which the user touches the touch panel 13 with his/her two fingers and in this touch state translates both the fingers in a direction perpendicular to the directions of movement of the fingers during the pinch-out gesture, the touch panel 13 detects two initial points where touches have been first detected and outputs to the gesture detecting section 23 two detection signals indicating respective series of points of movement from the initial points to final points where the touches have been last detected. Based on the two detection signals input to the gesture detecting section 23, the gesture detecting section 23 detects that the user's gesture is a return gesture and detects a direction of operation and the final points of the return gesture. In this embodiment, the return gesture is, for example, a gesture for, when only the adjacent two split regions D1, D2 are displayed on the display screen of the display section 12 at a split ratio of the display screen according to the ratio between the amounts of movement of the fingers as shown in FIG. 8B, returning the display on the display screen to the images of the original four split regions D1 to D4 with a single gesture (return gesture) shown in FIG. 10A.

Figure 6A:
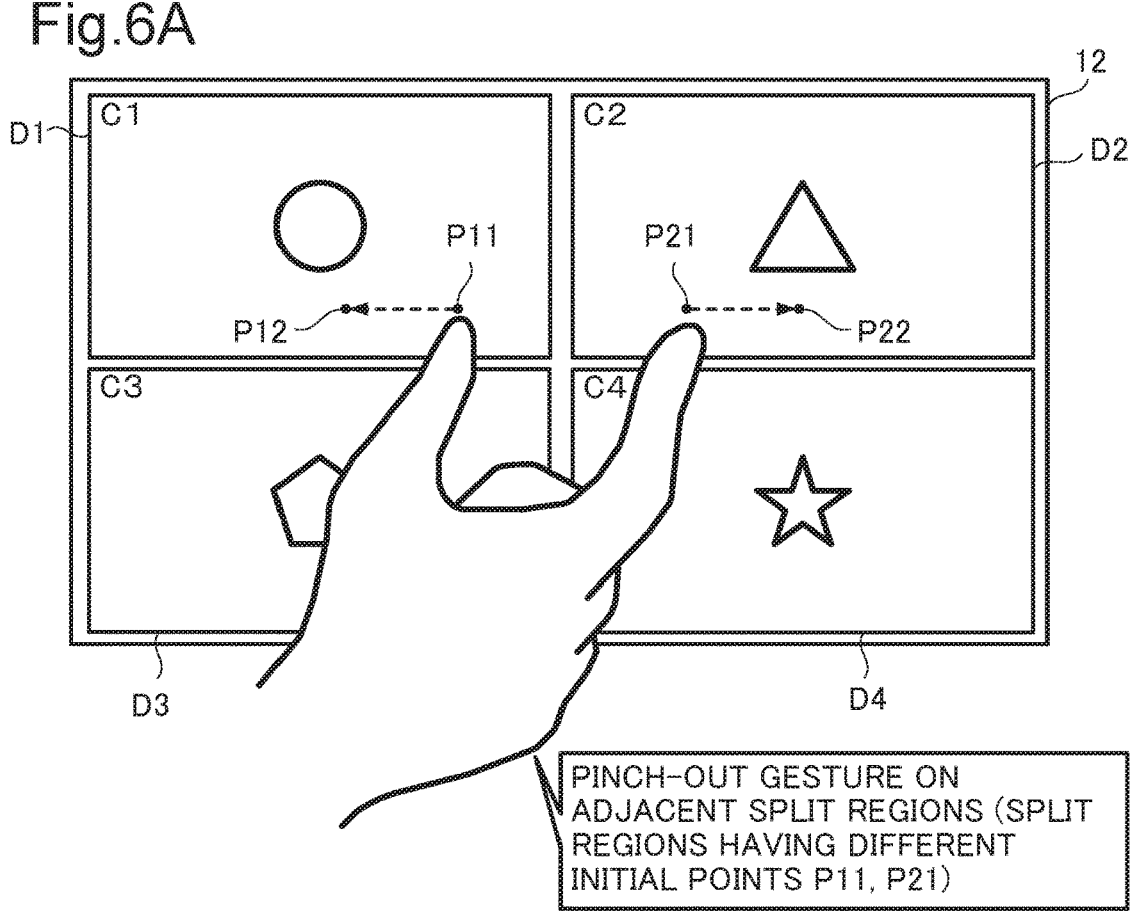
FIG. 6A is a view showing a pinch-out gesture on adjacent two of the four split regions of the display screen.
Figure 6B:
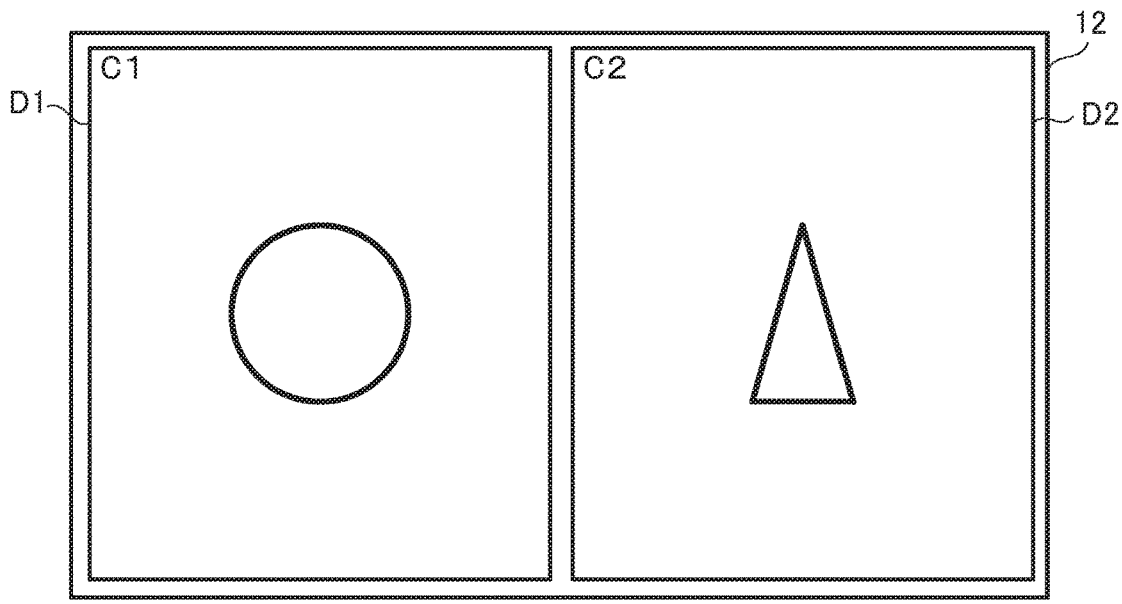
FIG. 6B is a view showing a two-split display using the two split regions subjected to the pinch-out gesture shown in FIG. 6A.

When the gesture detecting section 23 detects a pinch-out gesture in which, as shown in FIG. 6A, the user touches a point (for example, an initial point P11) in the split region D1 of the display screen of the display section 12 and a point (for example, an initial point P21) in the split region D2 of the display screen with his/her thumb and index finger, respectively, and spreads both the fingers apart in the touch state, the region setting section 24 makes a setting that only two split regions D1, D2 obtained by splitting the display screen of the display section 12 into halves are placed within the display screen so that the two split regions D1, D2 are aligned along the directions of the pinch-out gesture as shown in FIG. 6B.

The display control section 26 allows an enlarged display of the images in the two split regions D1, D2 set by the region setting section 24 and shown in FIG. 6B and avoids a display of the images of the split regions D3, D4 (see FIG. 6A) other than the above two split regions D1, D2. By making the above pinch-out gesture, only the images of, among the four split regions D1 to D4, adjacent two split regions subjected to the pinch-out gesture can be displayed on an enlarged scale with a single gesture.

Although, in this embodiment, as shown in FIG. 6B, the display control section 26 allows the display section 12 to display the adjacent two split regions D1, D2 of the display screen by enlarging them at a different horizontal to vertical ratio from the horizontal to vertical ratio between the two split regions D1, D2 before enlargement shown in FIG. 6A, that is, without maintaining the aspect ratio, the display control section 26 may allow the display section 12 to display the split regions D1, D2 by enlarging them while maintaining the aspect ratio.

Figure 7A:
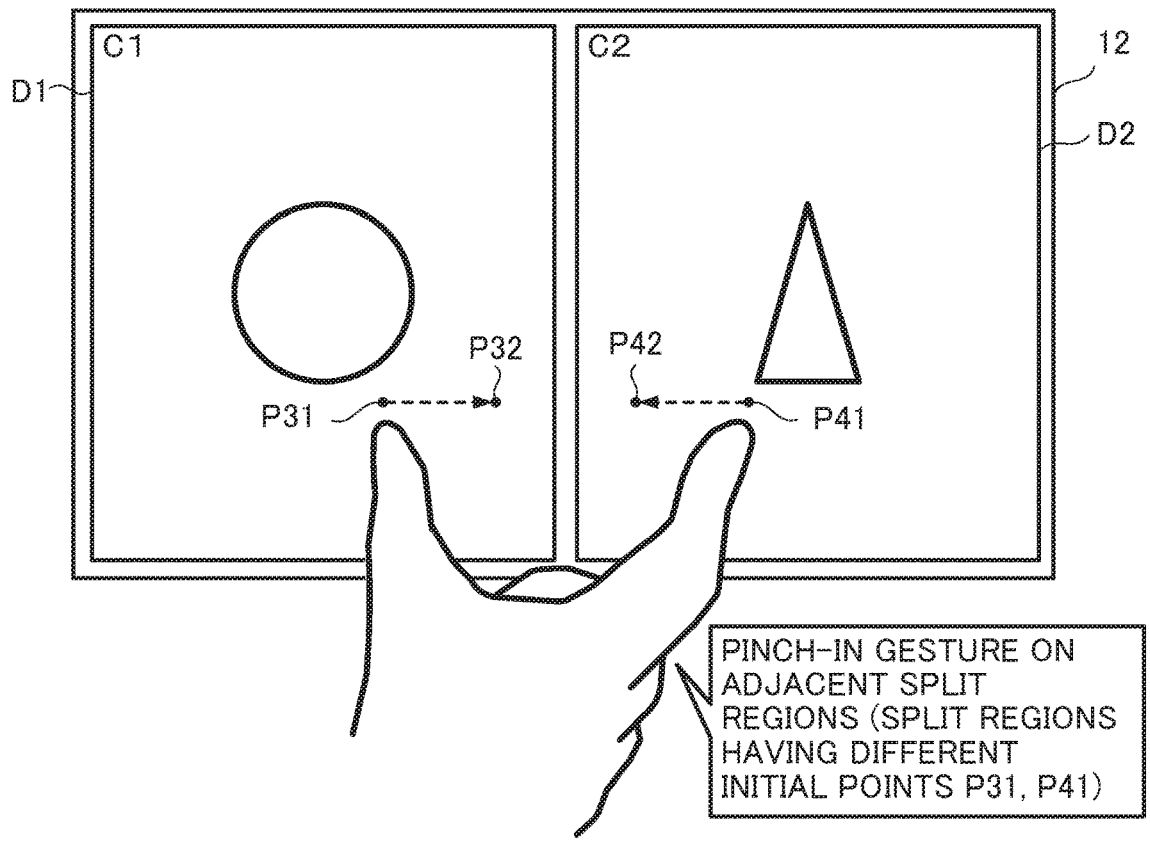
FIG. 7A is a view showing a pinch-in gesture on the two split regions shown in FIG. 6B.
Figure 7B:
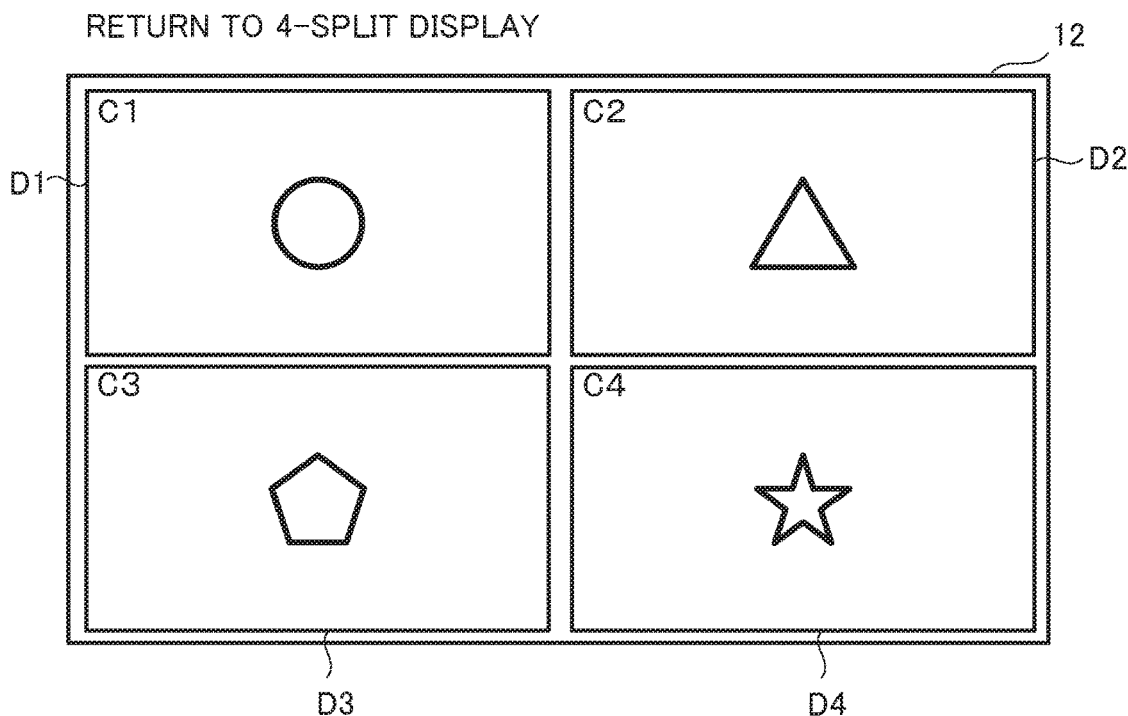
FIG. 7B is a view showing that the display has been returned to an original four-split display by the pinch-in gesture shown in FIG. 7A.

When the gesture detecting section 23 detects a pinch-in gesture in which, as shown in FIG. 7A, the user touches a point (for example, an initial point P31) in the split region D1 and a point (for example, an initial point P41) in the split region D2 with his/her thumb and index finger, respectively, and brings both the fingers close to each other in the touch state, the region setting section 24 makes a setting that, as shown in FIG. 7B, the four split regions D1 to D4 before the pinch-out gesture are placed within the display screen. The display control section 26 allows the display section 12 to display the images of the split regions D1 to D4 in the original four split regions D1 to D4, respectively, set by the region setting section 24 and shown in FIG. 7B. By making the above pinch-in gesture, the display on the display screen can be returned to a display of the four split regions D1 to D4 displayed before the pinch-out gesture, i.e., an original split display.

When the gesture detecting section 23 detects the pinch-out gesture, the split ratio calculating section 25 determines a split ratio of the display screen of the display section 12 from the ratio between the amounts of movement of the fingers during the pinch-out gesture. For example, the storage section 15 previously stores a calculation table showing the relationship of the ratio between the amounts of movement of the fingers with the split ratio of the display screen, and the split ratio calculating section 25 determines the split ratio of the display screen from the ratio between the amounts of movement of the fingers detected by the gesture detecting section 23 and the calculation table. Specifically, in FIG. 8A, the gesture detecting section 23 detects a first amount of movement (for example, 15 mm) of the thumb from an initial point P51 to a final point P52 and a second amount of movement (for example, 5 mm) of the index finger from an initial point P61 to a final point P62. The split ratio calculating section 25 calculates the ratio between the first amount of movement (for example, 15 mm) and the second amount of movement (for example, 5 mmm) both detected by the gesture detecting section 23 to be 3:1, identifies an input value in the calculation table to which the calculated ratio between the amounts of movement belongs, and determines the split ratio (3:1 in this case) of the display screen corresponding to the identified input value in the calculation table. As shown in FIG. 8B, the region setting section 24 sets both the split regions D1, D2 at respective sizes according to the split ratio determined by the split ratio calculating section 25. As shown in FIG. 8B, the display control section 26 allows an enlarged display of the images in both the split regions D1, D2 having sizes according to the above split ratio. In this manner, as shown in FIG. 8B, both the split regions D1, D2 can be set at sizes reflecting the ratio between the amounts of movement of the users' fingers during the user's pinch-out gesture and the sizes of both the split regions D1, D2 can be specified with a single pinch-out gesture.

Figure 9B:
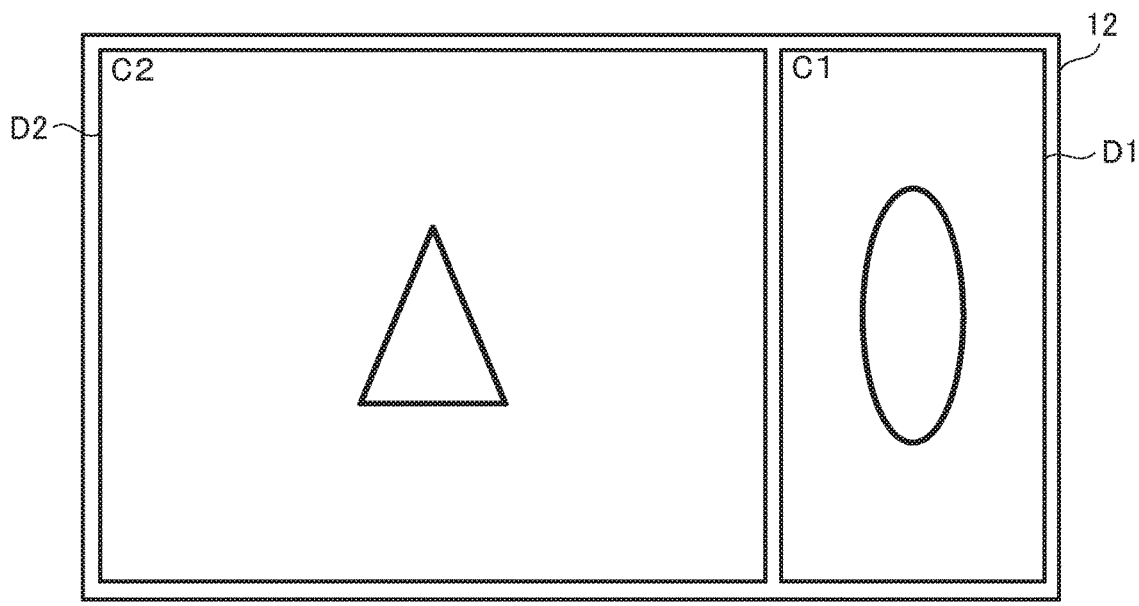
FIG. 9B is a view showing that the two split regions have been reversed in position according to the swipe gesture shown in FIG. 9A.

When, during enlarged display of the images in both the split regions D1, D2 of sizes according to the above split ratio as shown in FIG. 9A, the gesture detecting section 23 detects a swipe gesture in which the user touches one split region (D2 in FIG. 9A) of both the split regions D1, D2 with a single finger and in this touch state moves the finger toward the other split region (D1 in FIG. 9A), the display control section 26 allows a display of the images of the split regions D1, D2 in reverse order as shown in FIG. 9B. By this swipe gesture, the images of both the split regions D1, D2 can be simply displayed in reverse order.

Furthermore, upon detection of the above pinch-out gesture, if the ratio between the amounts of movement of the fingers during the pinch-out gesture exceeds a predetermined upper limit ratio (for example, 4:1), the split ratio calculating section 25 determines the split ratio of the display screen to be an upper limit split ratio (for example, 4:1). Specifically, the split ratio calculating section 25 determines the split ratio to be the upper limit split ratio (for example, 4:1) which is the same ratio as the upper limit ratio (for example, 4:1). However, the upper limit ratio may be any value other than 4:1. The region setting section 24 sets both the split regions D1, D2 at sizes according to the upper limit split ratio (for example, 4:1) determined by the split ratio calculating section 25. The display control section 26 allows an enlarged display of the images in both the split regions D1, D2 having sizes according to the upper limit split ratio. In this manner, if the ratio (for example, 10:1) between the amounts of movement of the fingers during the pinch-out gesture shown in FIG. 8A exceeds the upper limit ratio (for example, 4:1), both the split regions D1, D2 are set at sizes according to the upper limit split ratio (for example, 4:1), which prevents the image of one of the split regions from being displayed extremely small.

When, during enlarged display of the images in both the split regions D1, D2 of sizes according to the above split ratio as shown in FIG. 8B, the gesture detecting section 23 detects a pinch-in gesture, the region setting section 24 sets both the split regions D1, D2 at such sizes that the areas of the split regions D1, D2 have a split ratio of 1:1 as shown in FIG. 6B. As shown in FIG. 6B, the display control section 26 allows a display of the images in both the split regions D1, D2 having sizes according to the above split ratio of 1:1. In this manner, by making a pinch-in gesture when images are displayed in both the split regions D1, D2 having sizes according to a split ratio as shown in FIG. 8B, the display of both the split regions D1, D2 can be returned to the display of both the split regions D1, D2 having sizes according to a split ratio of 1:1.

Figure 10A:
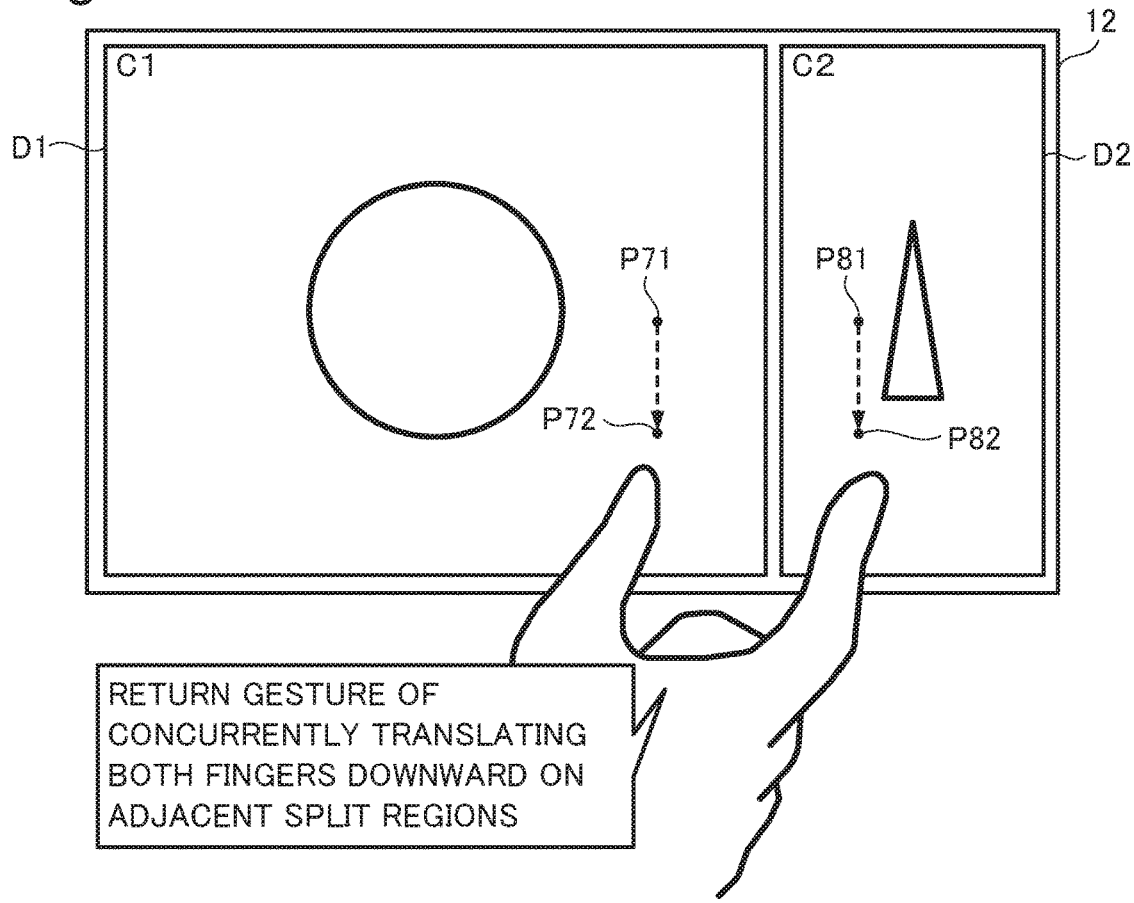
FIG. 10A is a view showing a return gesture on the adjacent split regions shown in FIG. 8B.
Figure 10B:
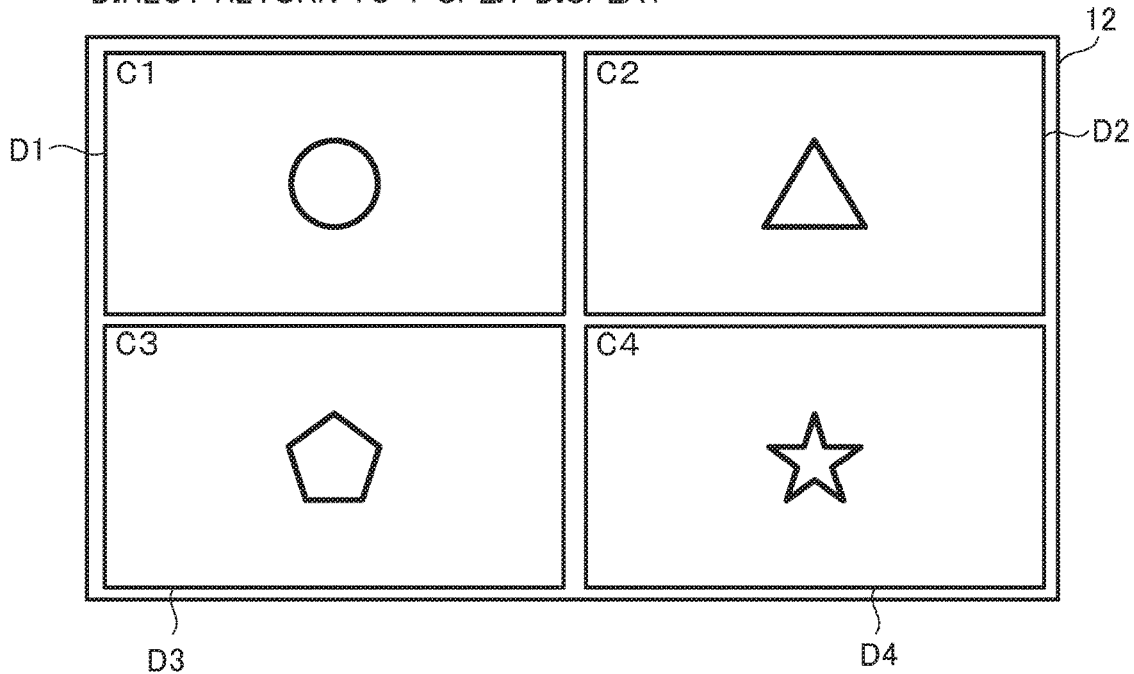
FIG. 10B is a view showing that the display has been returned to the original four-split display by the return gesture shown in FIG. 10A.

When, as shown in FIG. 10A, during enlarged display of the images in both the split regions D1, D2 of sizes according to the above split ratio, the gesture detecting section 23 detects a return gesture in which the user touches both the split regions D1, D2 with his/her two fingers and in this touch state translates both the fingers in a direction perpendicular to the directions of spreading of the fingers, the region setting section 24 returns the setting to a setting of the four split regions D1 to D4 displayed before only both the split regions D1, D2 are displayed (i.e., a setting of an original four-split screen), as shown in FIG. 10B. As shown in FIG. 10B, the display control section 26 allows the display section 12 to display, in the four split regions D1 to D4 set by the region setting section 24, their respective associated images. In this manner, when only the adjacent two split regions D1, D2 are displayed on the display screen of the display section 12 at a split ratio of the display screen according to the ratio between the amounts of movement of the fingers as shown in FIG. 8B, the display on the display screen can be returned to the images of the original four split regions D1 to D4 with a single gesture (return gesture) shown in FIG. 10A.

The event determination section 27 determines whether or not a predetermined specific event has occurred in relation to the images of the adjacent two split regions D1, D2 of the display screen shown in FIG. 6B. This specific event is, for example, the appearance of an object person to be monitored (the circle shown in FIG. 6B). Specifically, in this embodiment, the event determination section 27 subjects the images of the adjacent two split regions D1, D2 of the display screen displayed as shown in FIG. 6B by the pinch-out gesture shown in FIG. 6A to image recognition processing (for example, known face recognition processing or person recognition processing) to determine whether or not an object person or a non-human object is contained in the images.

In this embodiment, the user previously makes a hold-down gesture on any point in, among the four split regions D1 to D4 of the display screen shown in FIG. 5, for example, the split region D1, thus specifying an object person (for example, shown by a circle) contained in the image of the split region D1 as an object person to be monitored. Specifically, when the gesture detecting section 23 detects the above hold-down gesture, the event determination section 27 recognizes the image of the split region D1 on which the hold-down gesture has been detected, and specifies an object person (for example, shown by a circle) contained in the image of the split region D1 as an object person to be monitored. For example, the event determination section 27 performs known face recognition processing and thus extracts, based on image information displayed in the split region D1, face recognition information on the object person (for example, information representing facial features, including eyes, nose, and mouth, in a face region determined from the image of the object person). Furthermore, the event determination section 27 allows the storage section 15 to store the extracted face recognition information on the object person as registered data for matching. When the gesture detecting section 23 detects a hold-down gesture again, the event determination section 27 deletes the face recognition information on the object person as registered data for matching stored in the storage section 15 and cancels the specification of the object person to be monitored.

Next, the event determination section 27 determines, for each of the adjacent two split regions D1, D2 of the display screen shown in FIG. 6B, whether or not the object person to be monitored (for example, shown by a circle) is contained in the image represented in each of the two split regions D1, D2. Specifically, the event determination section 27 performs the known face recognition processing to determine whether or not face recognition information on a person extracted based on the image information on each split region D1, D2 matches the registered data for matching in the storage section 15. If the face recognition information matches the registered data for matching, the event determination section 27 determines that the object person to be monitored (for example, shown by a circle) is contained in the image of the split region (the split region D1 in this case).

When the event determination section 27 determines that a specific event has occurred, the region setting section 24 does not change the number of split regions to be displayed within the display screen even if the gesture detecting section 23 detects a pinch-in gesture. For example, when it is determined that a specific event has occurred in relation to the image of the split region D1 shown in FIG. 7, even if a pinch-in gesture shown in FIG. 7A has been made, the pinch-in gesture is made invalid, the display screen shown in FIG. 7A is maintained without returning to the four-split display shown in FIG. 7B, and the number of split regions displayed does not change. By doing so, the image containing the specific event can be prevented from being displayed small by the pinch-in gesture. In other words, the image containing the object person to be monitored can be prevented from accidentally becoming less likely to be found.

Although, in this embodiment, the target object to be monitored is an object person to be monitored (for example, shown by a circle) as shown in FIG. 5, the target object to be monitored may be, for example, a predetermined non-human object (such as an extinguisher). In this case, the event determination section 27 can perform, for example, known pattern matching image processing to determine whether or not the non-human object (for example, an extinguisher) is contained in the images of the split regions D1 to D4. When the event determination section 27 determines that the non-human object (for example, an extinguisher) is contained, for example, in the image of the split region D1 shown in FIG. 7A, even if a pinch-in gesture shown in FIG. 7A has been made, the pinch-in gesture is made invalid, the display screen shown in FIG. 7A is maintained without returning to the four-split display shown in FIG. 7B, and the number of split regions displayed does not change. By doing so, the image containing the non-human object to be monitored can be prevented from accidentally becoming less likely to be found.

Figure 2:
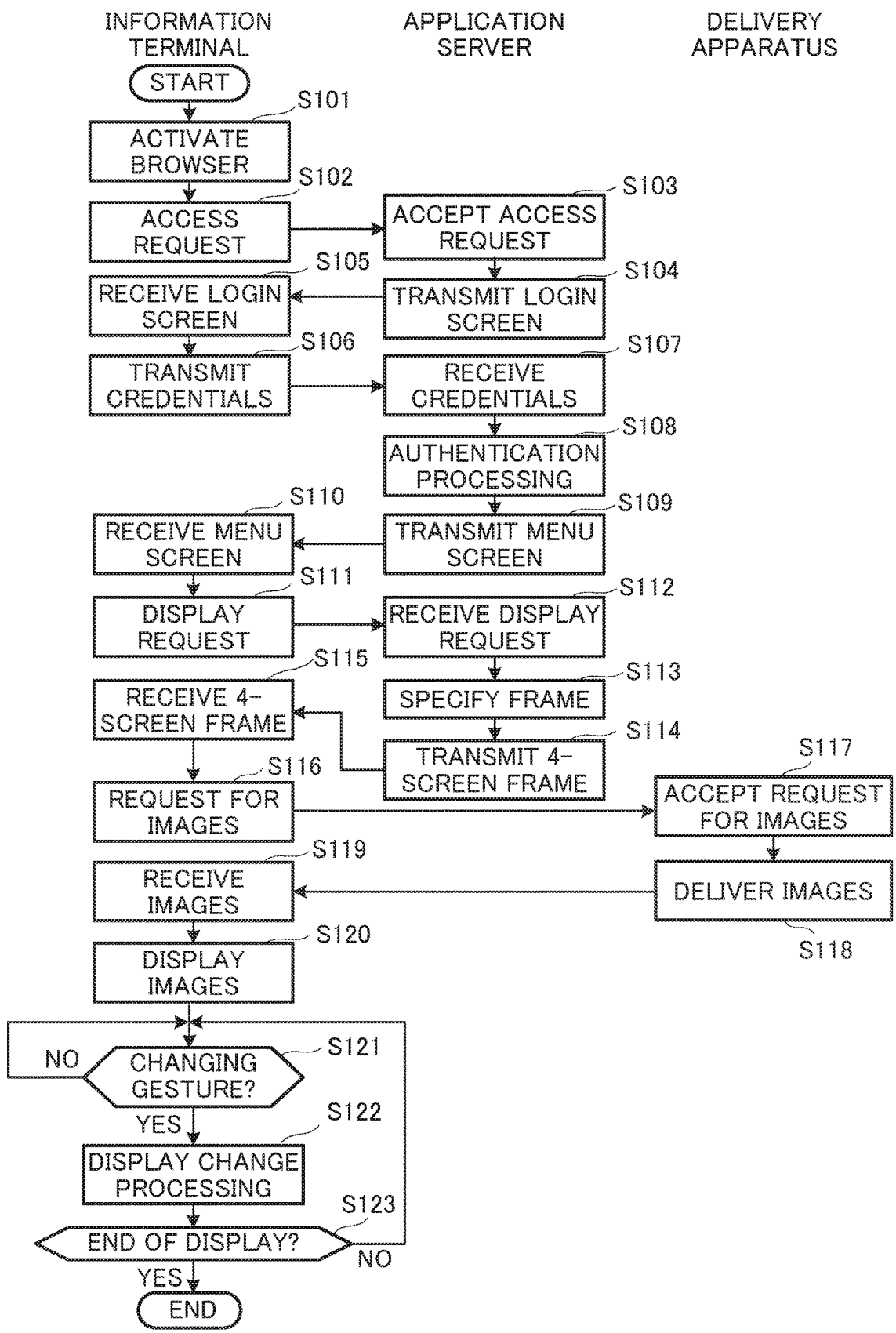
FIG. 2 is a flowchart showing image display processing in the information processing system.

Next, a description will be given of image display processing in the information processing system 100 according to this embodiment, i.e., processing for viewing each monitor image with a Web browser on the information terminal 10, with reference to the flowchart shown in FIG. 2 and others.

First, the control section 21 of the information terminal 10 activates a browser based on an activation operation of a user (S101), specifies for the browser the URL (uniform resource locator) of the application server 40, and makes an access request to access the specified URL (S102). The application server 40 accepts the access request (S103) and transmits screen information for displaying a login screen (S104).

The communication section 14 of the information terminal 10 receives the screen information for displaying the login screen (S105). The control section 21 of the information terminal 10 transmits credentials including ID information and a password (S106). The application server 40 receives the credentials (S107), performs authentication processing using the received credentials (S108), and transmits screen information for displaying a menu screen (operation menu) (S109).

The communication section 14 of the information terminal 10 receives the screen information for displaying the menu screen (S110). Then, the display control section 26 of the information terminal 10 allows the display section 12 to display the menu screen. This menu screen provides an operation item for selecting the display of monitor images from the delivery apparatus 30 and other items.

When the operation item for selecting the display of monitor images from the delivery apparatus 30 is selected on the menu screen of the display section 12, the control section 21 of the information terminal 10 makes to the application server 40 a display request for displaying the monitor images taken with the four monitoring cameras 31 to 34 (S111).

The application server 40 accepts the display request (S112) and specifies a frame (S113). The initial setting (default) is configured to provide a multi-screen display and, therefore, a frame for a multi-screen display is specified. More specifically, the application server 40 specifies screen information for displaying a split screen (split regions) in which a plurality of pieces of frame information for displaying a plurality of images are associated with the IP addresses of the monitoring cameras to be displayed in the respective frame regions. The frame in this embodiment includes four split regions (referred to as a four-screen frame) formed by splitting the display screen of the display section 12 into four equal parts composed of upper left, upper right, lower left, and lower right parts. They are represented by a structured language, such as HTML.

The application server 40 transmits the screen information for displaying the four-screen frame (S114). The communication section 14 of the information terminal 10 receives the screen information for displaying the four-screen frame (S115).

The control section 21 of the information terminal 10 requests images from the four monitoring cameras 31 to 34 (S116). Specifically, using the IP addresses of the four monitoring cameras 31 to 34 contained in the screen information for displaying the four-screen frame and associated with the respective frame segments, the control section 21 requests the four monitoring cameras 31 to 34 to deliver their images.

The delivery apparatus 30 accepts the request to deliver the monitor images taken with the four monitoring cameras 31 to 34 (S117). The delivery apparatus 30 delivers the monitor images taken with the four monitoring cameras 31 to 34 to the information terminal 10 (S118). The communication section 14 of the information terminal 10 receives the respective monitor images from the four monitoring cameras 31 to 34 (S119).

The display control section 26 of the information terminal 10 allows the display section 12 to display on the display screen images in the browser in which the monitor images received from the four monitoring cameras 31 to 34 are applied into the respective associated frame segments (S120). In other words, as shown in FIG. 5, the display section 12 provides a four-split screen on which the respective monitor images received from the four monitoring cameras 31 to 34 are displayed.

The gesture detecting section 23 of the information terminal 10 determines whether or not a changing gesture for changing the display screen (such as a pinch-out gesture, a pinch-in gesture, a swipe gesture or a return gesture) has been made (S121). If a changing gesture has been made ("Yes" in S121), the control section 21 performs display change processing involved in the changing gesture (S122).

Next, a description will be given of the display change processing in the information processing system 100 according to this embodiment, i.e., processing for viewing each monitor image with a Web browser on a display screen of the information terminal 10 changed according to a changing gesture for changing the display screen, with reference to the flowcharts shown in FIGS. 3 and 4 and others.

Figure 3:
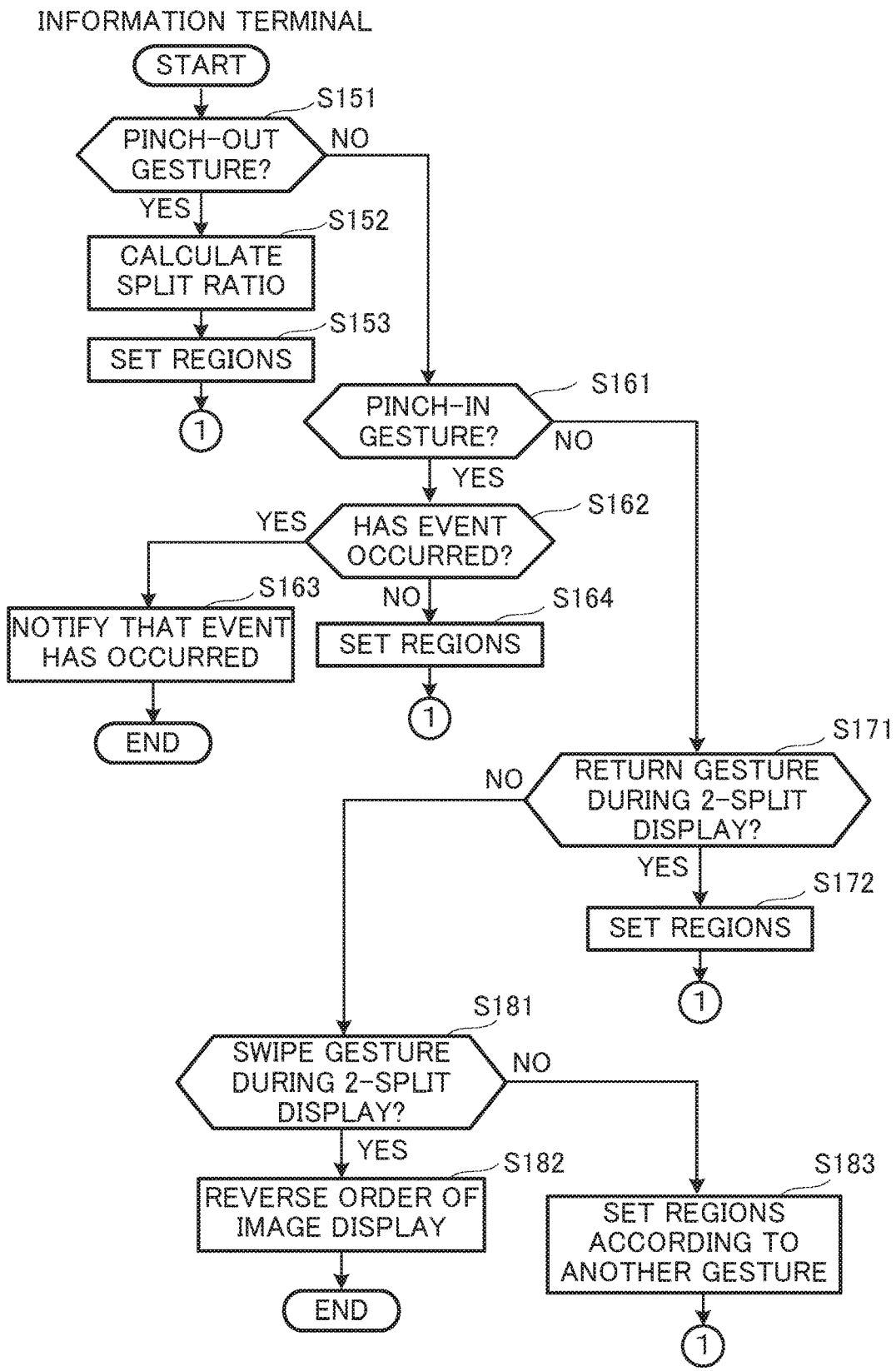
FIG. 3 is a flowchart showing display change processing on the information terminal.

As shown in FIG. 3, the gesture detecting section 23 of the information terminal 10 determines whether or not the user's gesture is a pinch-out gesture (S151). When the gesture detecting section 23 detects a pinch-out gesture ("Yes" in S151), the split ratio calculating section 25 determines the split ratio of the display screen from the ratio between the amounts of movement of the fingers detected by the gesture detecting section 23 and the calculation table (S152). The region setting section 24 sets both the split regions D1, D2 at sizes according to the split ratio determined by the split ratio calculating section 25 (S153).

If in S151 no pinch-out gesture has been detected ("No" in S151), the gesture detecting section 23 determines whether or not the user's gesture is a pinch-in gesture (S161). When the gesture detecting section 23 detects a pinch-in gesture ("Yes" in S161), the event determination section 27 determines whether or not a predetermined specific event has occurred in relation to the images of the adjacent two split regions D1, D2 of the display screen shown in FIG. 6B (S162). When it is determined that the specific event has occurred ("Yes" in S162), the display control section 26 allows the display section 12 to display, on the display screen shown in FIG. 7A, a notification indication notifying that the specific event has occurred (for example, display "Occurrence of Event" in the split region D1) (S163), and ends this processing. On the other hand, when it is determined that the specific event has not occurred ("No" in S162), the region setting section 24 makes a setting that, as shown in FIG. 7B, the four split regions D1 to D4 before the pinch-out gesture are placed within the display screen (S164).

If in S161 no pinch-in gesture has been detected ("No" in S161), the gesture detecting section 23 determines whether or not the user's gesture is a return gesture (S171). When the gesture detecting section 23 detects a return gesture ("Yes" in S171), the region setting section 24 returns the setting to a setting of the four split regions D1 to D4 displayed before only both the segmented regions D1, D2 are displayed (i.e., a setting of the original four-split screen), as shown in FIG. 10B (S172).

If in S171 no return gesture has been detected ("No" in S171), the gesture detecting section 23 determines whether or not the user's gesture is a swipe gesture (S181). When the gesture detecting section 23 detects a swipe gesture ("Yes in S181), the display control section 26 allows a display of the images of the split regions D1, D2 in reverse order as shown in FIG. 9B (S182), and ends this processing. On the other hand, if no swipe gesture has been detected ("No" in S181), the region setting section 24 makes a region setting according to another gesture (S183).

Figure 4:
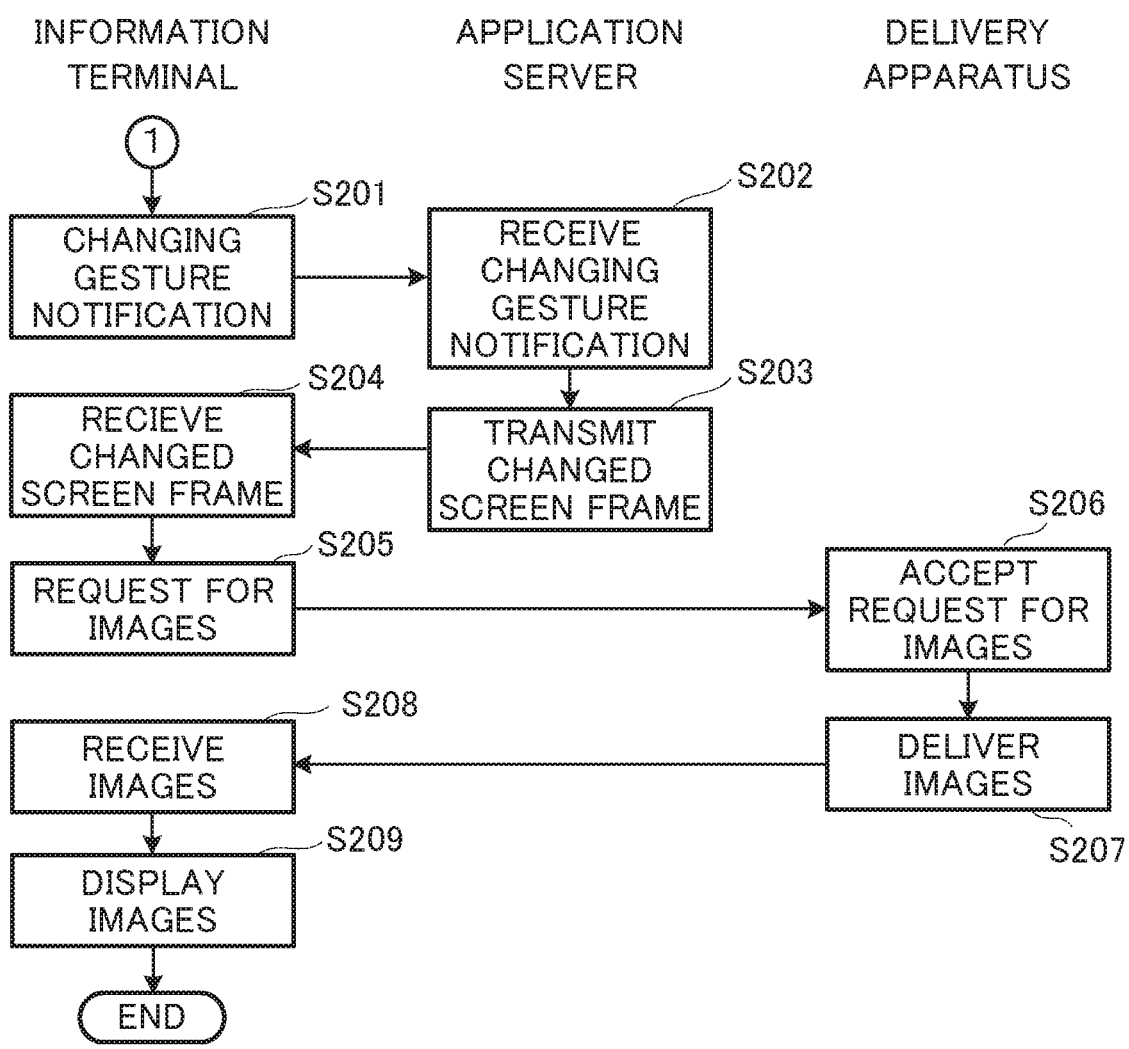
FIG. 4 is a flowchart showing processing for changing a split display on the information terminal.

After the step S153, S164, S172 or S183 shown in FIG. 3, as shown in FIG. 4, the control section 21 of the information terminal 10 makes a changing gesture notification (a pinch-out gesture notification, a pinch-in gesture notification, a return gesture notification or other gesture notifications) notifying the application server 40 that a gesture for changing the display screen has been made (S201).

Specifically, the control section 21 of the information terminal 10 outputs to the application server 40 a pinch-out gesture notification, a pinch-in gesture notification or a return gesture notification indicating a layout changed according to a user's pinch-out gesture, pinch-in gesture or return gesture, respectively, on the touch panel 13. Note that because no layout change is performed in the case of a swipe gesture, the control section 21 does not output a swipe gesture notification to the application server 40.

The application server 40 receives the changing gesture notification (S202) and transmits screen information for displaying a screen frame changed according to the pinch-out gesture, the pinch-in gesture or the return gesture (S203). The communication section 14 of the information terminal 10 receives the screen information for displaying the screen frame changed according to the gesture for changing the display screen (S204).

The control section 21 of the information terminal 10 requests images from the delivery apparatus 30. Specifically, using the IP addresses of the four monitoring cameras 31 to 34 contained in the screen information for displaying the changed screen frame and associated with the respective frame segments, the control section 21 requests the four monitoring cameras 31 to 34 to deliver their images (S205).

The four monitoring cameras 31 to 34 accept the request to deliver their images (S206) and deliver the images (S207). The communication section 14 of the information terminal 10 receives an image or images from necessary one or more of the four monitoring cameras 31 to 34 (S208). For example, if the two-split display shown in FIG. 6B is provided by a pinch-out gesture, the communication section 14 receives respective images from two monitoring cameras 31, 32. For another example, if the four-split display shown in FIG. 7B is provided by a pinch-in gesture, the communication section 14 receives respective images from the four monitoring cameras 31 to 34. Alternatively, if the display screen is returned at once to the four-split display shown in FIG. 10B by a return gesture, the communication section 14 receives respective images from the four monitoring cameras 31 to 34. Still alternatively, if the images of both the split regions D1, D2 shown in FIG. 9A are displayed in reverse order by a swipe gesture, the communication section 14 does not receive respective images of the two monitoring cameras 31, 32 and the display control section 26 displays the images of both the split regions D1, D2 in reverse order as shown in FIG. 9B. Instead of this, the information terminal 10 may receive respective images from the two monitoring cameras 31, 32.

The display control section 26 of the information terminal 10 allows the display section 12 to display the received images applied into the changed screen frame (S209).

Referring back to FIG. 2, after the display change processing (S122), the control section 21 of the information terminal 10 determines whether or not the end of display for viewing the monitoring cameras has been accepted (S123). When determining that the end of display has not been accepted ("No" in S123), the control section 21 returns the processing to S121. When determining that the end of display has been accepted ("Yes" in S123), the control section 21 ends this processing.

A thus far described, in this embodiment, when the gesture detecting section 23 detects a pinch-out gesture shown in FIG. 6A, the region setting section 24 makes a setting that only two split regions D1, D2 obtained by splitting the display screen of the display section 12 into halves are placed within the display screen so that the two split regions D1, D2 are aligned along the directions of the pinch-out gesture as shown in FIG. 6B. The display control section 26 allows an enlarged display of the images in the two split regions D1, D2 set by the region setting section 24 and shown in FIG. 6B and avoids a display of the images of the split regions D3, D4 (see FIG. 6A) other than the above two split regions D1, D2. Therefore, by making the above pinch-out gesture, only the images of, among the four split regions D1 to D4, adjacent two split regions subjected to the pinch-out gesture can be displayed on an enlarged scale with a single gesture.

In the general display device described in BACKGROUND above, when, for example, a single pinch-out gesture is made on a 4-in-1 image, two images involved in the pinch-out gesture are displayed in a disassembled relation, while the other two images are displayed to remain assembled in a 2-in-1 image. Therefore, in the above general display device, even if, for example, a single pinch-out gesture is made on a 4-in-1 image, it is not possible to display only two images involved in the pinch-out gesture on the display screen and concurrently display the two images on an enlarged scale. Furthermore, in the above general display device, since the assembly of the assembled images displayed on the display screen is dissolved by a pinch-out gesture, the number of split regions of the display screen cannot be changed by a pinch-out gesture.

Unlike the above general display device, in this embodiment, only images of adjacent two of three or more split regions of a display screen can be displayed on an enlarged scale with a single gesture.

The specific events described above may include, in addition to the above appearance of an object person to be monitored (for example, shown by a circle), the emergence/ exit, takeaway, and leaving behind of a non-human object, such as a body of matter or an article. For example, the takeaway of an object can be detected by recognizing that the image of the object has disappeared from a monitor image. The leaving behind of an object can be detected by recognizing that the image of the object has appeared in a monitor image. Furthermore, the specific events may include the detection of entry/exit or the like of an object person, changes in the state of detection of the movement of an object person (for example, detection of suspicious behaviors of the object person by automatic tracking of the object person using face recognition processing in monitor images taken with monitoring cameras), start/stop of the information processing system 100, start/stop of video recording, and changes in the detection state of an external sensor (for example, the detection of an open state of a toner cover of a multifunction peripheral as an object in the absence of error).

In relation to the specific event, the information terminal 10 may not perform image recognition processing of monitor images, but the application server 40 or the delivery apparatus 30 may perform image recognition processing of monitor images to detect the specific event and deliver information containing image delivery and event information associated with the image delivery to the information terminal 10, so that the information terminal 10 can know the occurrence of the specific event.

Although the description in the above embodiment and modifications has been given taking as an example the monitor images taken with the monitoring cameras 31 to 34, the images to be applied to the present disclosure are not limited to such monitor images but may be images for purposes other than monitoring, for example, TV pictures of sports, documentary or other programs.

The method of displaying images by the information terminal 10 as described in the above embodiment can be provided as a program. This program is recorded on a non-transitory computer-readable recording medium, such as a hard disk, a CD-ROM, a DVD-ROM or a semiconductor memory. In this case, the non-transitory computer-readable recording medium with the program recorded thereon is one embodiment of the present disclosure.

While the present disclosure has been described in detail with reference to the embodiments thereof, it would be apparent to those skilled in the art the various changes and modifications may be made therein within the scope defined by the appended claims.

What is claimed is:
1. An information terminal comprising:
a display section;
a display control section that enables the display section to display respective images in a plurality of split regions into which a display screen is split;
a touch panel provided on the display screen of the display section;
a gesture detecting section that detects, when the display control section enables the display section to display the images in three or more split regions of the display screen, a pinch-out gesture of spreading two fingers placed on respective adjacent two of the three or more split regions while keeping the two fingers in touch with the adjacent two split regions based on a detection signal from the touch panel; and
a region setting section that makes, upon detection of the pinch-out gesture by the gesture detecting section, a setting that the adjacent two split regions are aligned on the display screen along directions of spreading movement of the two fingers during the pinch-out gesture and that the display screen is split into two split regions to place only both the two split regions within the display screen,
wherein the display control section enables an enlarged display of the images of the split regions subjected to the pinch-out gesture in both the split regions set by the region setting section and avoids a display of the images of the one or more split regions other than both the split regions,
the information terminal further comprising a split ratio calculating section that, upon detection of the pinch-out gesture by the gesture detecting section, determines a split ratio of the display screen from a ratio between amounts of movement of the fingers during the pinch-out gesture,
wherein the region setting section sets both the split regions at respective sizes according to the split ratio determined by the split ratio calculating section,
the display control section enables an enlarged display of the images of the split regions subjected to the pinch-out gesture in both the split regions having sizes according to the split ratio,
the gesture detecting section detects, based on a detection signal from the touch panel, a pinch-in gesture of bringing two fingers placed on the respective adjacent two split regions of the display screen close to each other while keeping the two fingers in touch with the adjacent two split regions,
when, during enlarged display of the images of the split regions subjected to the pinch-out gesture in both the split regions of sizes according to the split ratio, the gesture detecting section detects the pinch-in gesture, the region setting section sets both the split regions at such sizes that areas of the split regions have a split ratio of 1:1, and
the display control section enables the display section to display both the split regions having sizes according to the split ratio of 1:1,
the information terminal further comprising an event determination section that determines whether or not a predetermined specific event has occurred in relation to the images of the adjacent two split regions of the display screen,
wherein when the event determination section determines that the specific event has occurred, the region setting section maintains a number of the split regions to be displayed within the display screen even if the gesture detecting section detects the pinch-in gesture.
2. The information terminal according to claim 1, further comprising a storage section that stores registered data for matching, wherein the event determination section recognizes the image of the split region within which the gesture detecting section has detected a hold-down gesture, extracts face recognition information on an object person contained in the image of the split region, allows the storage section to store the extracted face recognition information on the object person as the registered data for matching, determines whether face recognition information on a person extracted based on image information on each of the adjacent two split regions matches the registered data for matching in the storage section, and, upon matching of the face recognition information with the registered data, determines that the object person is contained in the image of the split region and that an appearance of the object person has occurred as the specific event.

3. An information terminal comprising:
a display section;
a display control section that enables the display section to display respective images in a plurality of split regions into which a display screen is split;
a touch panel provided on the display screen of the display section;
a gesture detecting section that detects, when the display control section enables the display section to display the images in three or more split regions of the display screen, a pinch-out gesture of spreading two fingers placed on respective adjacent two of the three or more split regions while keeping the two fingers in touch with the adjacent two split regions based on a detection signal from the touch panel; and
a region setting section that makes, upon detection of the pinch-out gesture by the gesture detecting section, a setting that the adjacent two split regions are aligned on the display screen along directions of spreading movement of the two fingers during the pinch-out gesture and that the display screen is split into two split regions to place only both the two split regions within the display screen,
wherein the display control section enables an enlarged display of the images of the split regions subjected to the pinch-out gesture in both the split regions set by the region setting section and avoids a display of the images of the one or more split regions other than both the split regions,
the information terminal further comprising a split ratio calculating section that, upon detection of the pinch-out gesture by the gesture detecting section, determines a split ratio of the display screen from a ratio between amounts of movement of the fingers during the pinch-out gesture,
wherein the region setting section sets both the split regions at respective sizes according to the split ratio determined by the split ratio calculating section,
the display control section enables an enlarged display of the images of the split regions subjected to the pinch-out gesture in both the split regions having sizes according to the split ratio,
if, upon detection of the pinch-out gesture, the ratio between the amounts of movement of the fingers during the pinch-out gesture exceeds a predetermined upper limit ratio, the split ratio calculating section determines the split ratio of the display screen to be an upper limit split ratio equal to the upper limit ratio,
the region setting section sets both the split regions at sizes according to the upper limit split ratio determined by the split ratio calculating section, and the display control section enables the display section to display both the split regions having sizes according to the upper limit split ratio.

4. A non-transitory computer-readable recording medium with a display control program recorded thereon, the display control program allowing a computer including a processor to function, when the processor executes the display control program, as:
a display control section that enables a display section to display respective images in a plurality of split regions into which a display screen is split;
a gesture detecting section that detects, when the display control section enables the display section to display the images in three or more split regions of the display screen, a pinch-out gesture of spreading two fingers placed on respective adjacent two of the three or more split regions while keeping the two fingers in touch with the adjacent two split regions based on a detection signal from a touch panel provided on the display screen of the display section; and
a region setting section that makes, upon detection of the pinch-out gesture by the gesture detecting section, a setting that the adjacent two split regions are aligned on the display screen along directions of spreading movement of the two fingers during the pinch-out gesture and that the display screen is split into two split regions to place only both the two split regions within the display screen,
the display control program further allowing the display control section to function to allow an enlarged display of the images of the split regions subjected to the pinch-out gesture in both the split regions set by the region setting section and avoid a display of the images of the one or more split regions other than both the split regions,
the display control program further allowing the computer to function, when the processor executes the display control program, as a split ratio calculating section that, upon detection of the pinch-out gesture by the gesture detecting section, determines a split ratio of the display screen from a ratio between amounts of movement of the fingers during the pinch-out gesture,
wherein the region setting section sets both the split regions at respective sizes according to the split ratio determined by the split ratio calculating section,
the display control section enables an enlarged display of the images of the split regions subjected to the pinch-out gesture in both the split regions having sizes according to the split ratio,
the gesture detecting section detects, based on a detection signal from the touch panel, a pinch-in gesture of bringing two fingers placed on the respective adjacent two split regions of the display screen close to each other while keeping the two fingers in touch with the adjacent two split regions,
when, during enlarged display of the images of the split regions subjected to the pinch-out gesture in both the split regions of sizes according to the split ratio, the gesture detecting section detects the pinch-in gesture, the region setting section sets both the split regions at such sizes that areas of the split regions have a split ratio of 1:1, and
the display control section enables the display section to display both the split regions having sizes according to the split ratio of 1:1,
the display control program further allowing the computer to function, when the processor executes the display control program, as an event determination section that determines whether or not a predetermined specific event has occurred in relation to the images of the adjacent two split regions of the display screen, wherein when the event determination section determines that the specific event has occurred, the region setting section maintains a number of the split regions to be displayed within the display screen even if the gesture detecting section detects the pinch-in gesture.

* * * * *